United States Patent
Yue et al.

(10) Patent No.: US 8,381,269 B2
(45) Date of Patent: Feb. 19, 2013

(54) SYSTEM ARCHITECTURE AND METHOD FOR SECURE WEB BROWSING USING PUBLIC COMPUTERS

(75) Inventors: Chuan Yue, Colorado Springs, CO (US); Haining Wang, Vienna, VA (US)

(73) Assignee: College of William and Mary, Williamsburg, VA (US)

( * ) Notice: Subject to any disclaimer, the term of this patent is extended or adjusted under 35 U.S.C. 154(b) by 241 days.

(21) Appl. No.: 12/891,853

(22) Filed: Sep. 28, 2010

(65) Prior Publication Data
US 2012/0079575 A1    Mar. 29, 2012

(51) Int. Cl.
G06F 7/04 (2006.01)
G06F 15/16 (2006.01)

(52) U.S. Cl. .......................... 726/4; 709/217

(58) Field of Classification Search .......... 380/247, 380/248, 249; 726/3, 4, 5; 455/566, 466; 705/26, 27
See application file for complete search history.

(56) References Cited

U.S. PATENT DOCUMENTS

| | | | |
|---|---|---|---|
| 6,871,213 B1* | 3/2005 | Graham et al. | 709/205 |
| 7,996,436 B2* | 8/2011 | Schneider et al. | 707/802 |
| 8,261,198 B2* | 9/2012 | Burckart et al. | 715/753 |
| 2002/0159088 A1* | 10/2002 | Yamakawa et al. | 358/1.15 |
| 2002/0174110 A1* | 11/2002 | Smith | 707/3 |
| 2003/0097448 A1* | 5/2003 | Menezes et al. | 709/227 |
| 2005/0246422 A1* | 11/2005 | Laning | 709/205 |
| 2006/0015763 A1* | 1/2006 | Nakajima | 714/4 |
| 2006/0034238 A1* | 2/2006 | Inoue et al. | 370/338 |
| 2008/0046366 A1* | 2/2008 | Bemmel et al. | 705/44 |
| 2008/0235107 A1* | 9/2008 | Nagarajayya | 705/26 |
| 2009/0019367 A1* | 1/2009 | Cavagnari et al. | 715/716 |
| 2009/0023475 A1* | 1/2009 | Chang et al. | 455/557 |
| 2009/0164581 A1* | 6/2009 | Bove et al. | 709/205 |
| 2009/0235329 A1* | 9/2009 | Chavez et al. | 726/3 |
| 2010/0115045 A1* | 5/2010 | Lin | 709/206 |
| 2010/0162126 A1* | 6/2010 | Donaldson et al. | 715/738 |
| 2010/0306642 A1* | 12/2010 | Lowet et al. | 715/234 |

OTHER PUBLICATIONS

Instant Co-Browsing: lightweith Real-time Collaborative Web Browsing, Alan W. Wsenther, Sep. 2007, Mitsubishi electric research laboratories, pp. 1-3.*
RCB: a simple and practicle framwork for real time collaborative browsing, Zi chu, the college of william and Mary, Jun. 2009, pp. 1-13.*

* cited by examiner

*Primary Examiner* — Eleni Shiferaw
*Assistant Examiner* — Abu Sholeman
(74) *Attorney, Agent, or Firm* — Jason P. McDevitt

(57) ABSTRACT

A secure web browsing method and security system architecture for a mobile device are provided. The architecture establishes a communication link between the mobile device and a computer. A routine transmitted from the mobile device to the computer synchronizes page content of the mobile device to the computer's internet browser. The architecture (i) detects user-supplied inputs to the page content on the computer's internet browser, (ii) generates a verification request at the mobile device when user-supplied inputs are so-detected, and (iii) transmits the user-supplied inputs from the mobile device as an internet communication only when the verification request is confirmed by the user at the mobile device. The architecture also processes each new page loaded at the mobile device to perform removal and/or obfuscation of selected information associated with the new page in order to generate a modified page. The computer's internet browser is updated to the modified page.

9 Claims, 4 Drawing Sheets

SYSTEM ARCHITECTURE AND METHOD FOR SECURE WEB BROWSING USING PUBLIC COMPUTERS

STATEMENT REGARDING FEDERALLY SPONSORED RESEARCH AND DEVELOPMENT

This invention was made with government support under Grant No. CNS0916022 awarded by the National Science Foundation. The government has certain rights in the invention.

FIELD OF INVENTION

The field of the invention relates generally to web browsing security, and more particularly to a system architecture and method that allows a user to securely browse, visit and provide data to internet web sites from a public computer.

BACKGROUND OF THE INVENTION

Internet or web browsing has become one of the greatest uses of personal computing devices. Indeed web browsing has become such an integral part of everyday life that web browsers serve as the interface to many important and private tasks such as banking, shopping, bill-paying, securities purchases, investment/portfolio management, etc. To facilitate the general population's "wherever and whenever" desire for internet access, many public environments such as cafes, libraries, airport lounges, hotel business centers, etc., provide people with internet-connected public computers. These public computers often have high-speed internet connections using wireless communication links. They are also convenient to use since they normally have full-size keyboards and large displays. Accordingly, users of these public computers include not only people without a personal computing device, but also those who are carrying a mobile computing device limited by a smaller keyboard and/or display (e.g., laptop, personal data assistant, cellular phone with internet capabilities, etc.). In particular, display limitations of one's mobile computing device can make their use less than desirable for many web browsing tasks thereby making public computer use seem more attractive.

Unfortunately, public computers are usually far less trustworthy than one's own computer and mobile computing device. That is, public computers are far more likely to have malware or spyware operating thereon. Since public computers are used by many people to run different applications and visit various websites, it is very likely for them to be infected with malware or spyware. Such malware/spyware is designed to, for example, log user inputs to the computer (e.g., usernames and passwords), steal account information, and even secretly hijack a secure (e.g., HTTPS) web browsing session in order to facilitate fraudulent transactions. For these reasons, there are numerous articles and corporate warnings recommending that people not enter any "sensitive" information in a public computer. However, these warnings are often ignored since the "threats" are not visible to the user and, therefore, do not appear as ominous as they truly are.

BRIEF SUMMARY OF THE INVENTION

Accordingly, it is an object of the present invention to provide a system and method for making web browsing on public computers secure.

Another object of the present invention is to provide a system and method that facilitates the convenient use of public computers for tasks requiring and/or accessing private/sensitive information while protecting such private/sensitive information.

Still another object of the present invention is to provide a system and method for secure web browsing from public computers that is user-controlled and does not require modification of the public computers.

In accordance with the present invention, a secure web browsing method and web browsing security system architecture for a mobile device that has initiated an internet communication session via a local area network (LAN) are provided. A first processing architecture establishes a communication link with a computer having an internet browser capable of internet communication via the LAN. The first processing architecture transmits a routine to the computer via the communication link. The routine synchronizes page content of the mobile device to the computer's internet browser. A second processing architecture (i) detects user-supplied inputs to the page content on the computer's internet browser, (ii) generates a verification request at the mobile device when at least a portion of the user-supplied inputs are so-detected, and (iii) transmits the user-supplied inputs from the mobile device as an internet communication via the LAN only when the verification request is confirmed by the user at the mobile device. A third processing architecture processes each new page loaded at the mobile device to perform at least one of removal and obfuscation of selected information associated with the new page in order to generate a modified page. The third processing architecture also transmits the modified page to the computer using the communication link. The page content of the computer's internet browser is updated to the modified page using the routine previously transmitted to the computer via the communication link.

BRIEF DESCRIPTION OF THE DRAWINGS

The summary above, and the following detailed description, will be better understood in view of the drawings that depict details of preferred embodiments.

DETAILED DESCRIPTION OF THE INVENTION

Figure 1:
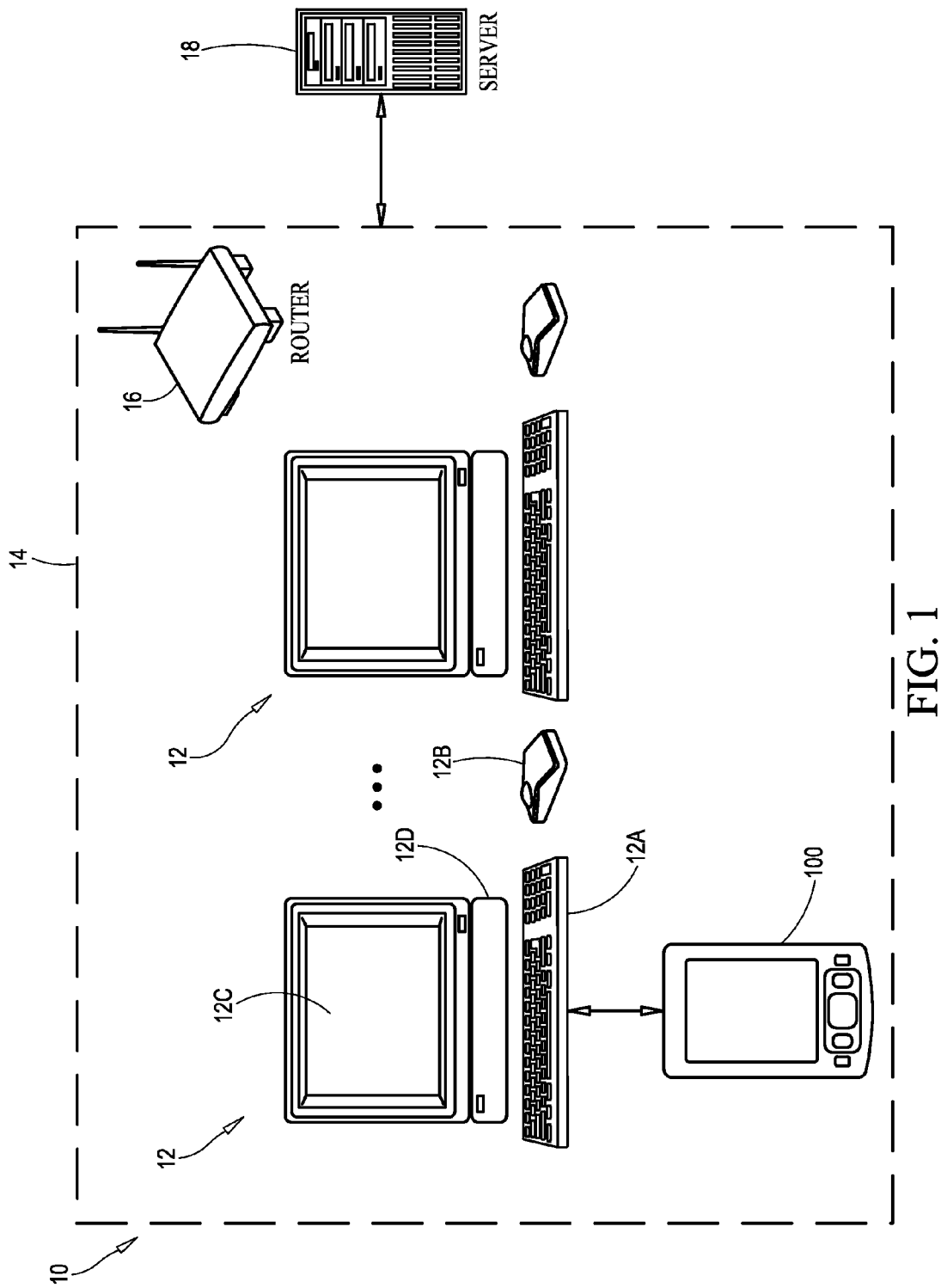
FIG. 1 illustrates a typical public computer environment where public computers can access the internet.

Referring now to the drawings and in particular to FIG. 1, a typical public computer environment in illustrated and is referenced generally by numeral 10. Environment 10 includes one or more computers 12 that are located in a publicly-accessible area. Each of computers 12 will typically be a full-size personal computer (e.g., Windows-based, Mac, etc.) that includes a keyboard 12A, a mouse 12B, a display 12C, and a processor 12D equipped for internet communication using an internet browser (e.g., Internet Explorer, Firefox, etc.). For example, processor 12D can be equipped to communicate with the internet over a local are network (LAN) 14 that generally includes a router 16 hardwired to processors 12D or communicating with processors 12D in a wireless fashion. Regardless of how processor 12D communicates with router 16, it is also assumed that processor 12D is equipped for wireless communication. LAN 14 makes a connection to the internet via a server 18 that can be located locally or remotely with respect to LAN 14. The details of environment 10 are well-understood in the art and will not be described further herein. It is also to be understood that other types of public computer environments could be used in a conjunction with the present invention.

Prior to describing the system and method of the present invention, a scenario that invokes the present invention will be described with continued reference to FIG. 1. More specifically, the present invention can be invoked when a user (not shown) enters public computer environment 10 with the goal of using one of the computers 12 for an internet communication session. The user is assumed to be in possession of a mobile device 100 (e.g., a cellular phone, a personal data assistant or PDA, iPod, iPad, a notebook computer, a laptop computer, etc.) capable of accessing the internet. By way of illustrative example, it will be assumed for the remainder of the description that mobile device 100 is a cellular phone with internet accessibility given its ready availability for a vast majority of the population.

Figure 2:
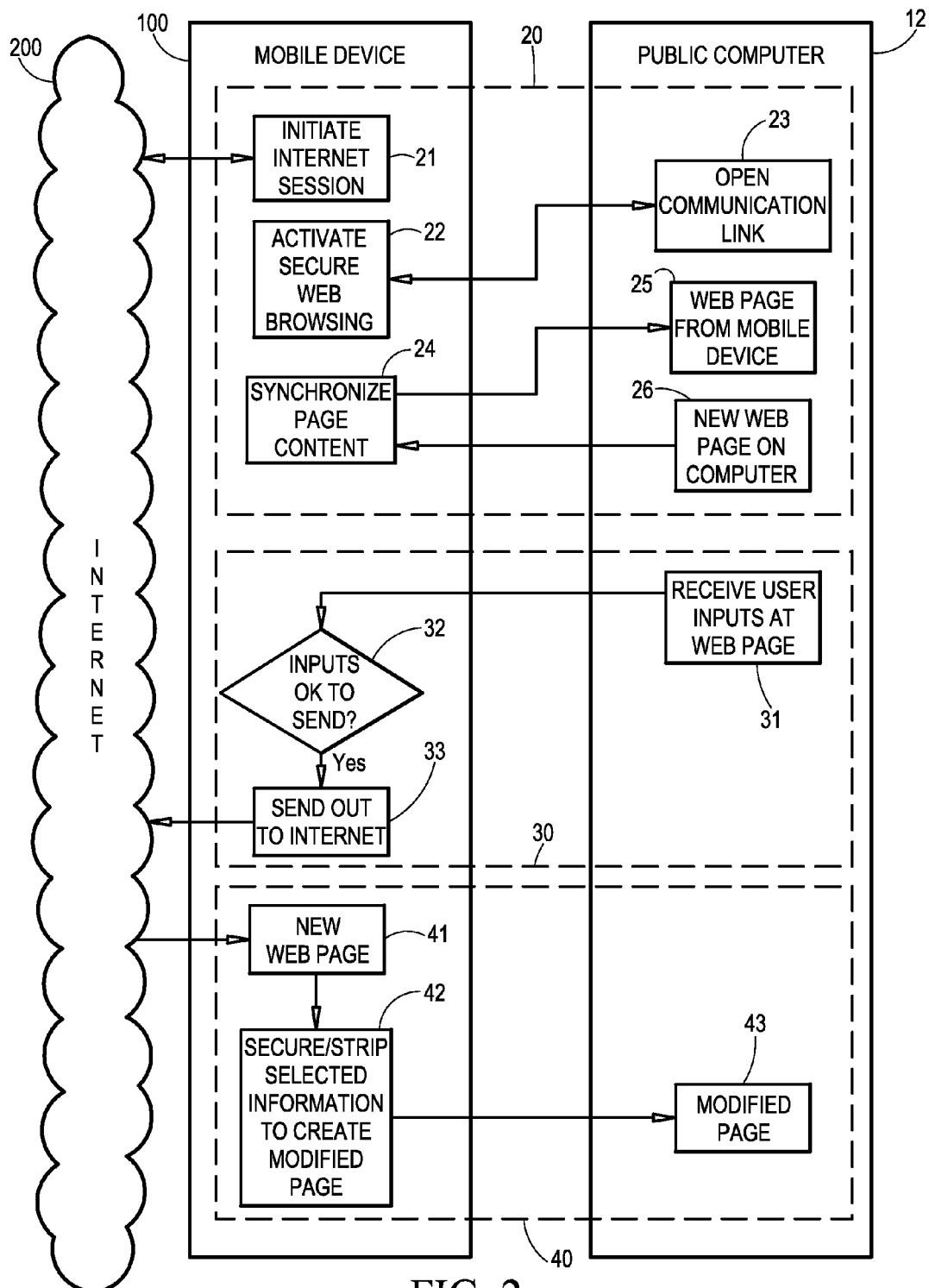
FIG. 2 is a top-level block diagram illustrating the three primary functions carried out by a web browsing security system in accordance with the present invention.

Referring additionally now to FIG. 2, the three primary functions carried out by the web browsing security system and method of the present invention are illustrated. While the system and architecture of the present invention need only be installed on a mobile device 100 as will be explained further below, a public computer 12 is part of a secure web browsing session in accordance with the present invention. Very generally, mobile device 100 (with the web browsing security system architecture of the present invention installed and operating thereon) serves as a browser extension between the internet 200 and public computer 12 that (i) prevents public computer 12 from tampering/changing any sensitive information entered on computer 12, and (ii) prevents the transfer of sensitive information to public computer 12. The three primary functions carried out by the present invention are communication control in dashed line box 20, request processing in dashed line box 30, and response generation in dashed line box 40. While the actual architecture for these three functions is resident on mobile device 100, some of the architecture's operations and operational effects impact computer 12.

Communication control 20 requires a user to first initiate an internet session at mobile device 100 as indicated at 21. Once mobile device 100 is communicating over internet 200, the user activates the secure web browsing architecture of the present invention (as indicated at 22) where such architecture is resident on mobile device 100. This operation will open a communication link 23 to public computer 12 such that page content synchronization 24 can function. Briefly, page content synchronization 24 causes new web pages 25 on mobile device 100 to be synchronized to the web browser of computer 12 and causes new web pages 26 on computer 12 to be synchronized to mobile device 100.

Request processing 30 operates to screen user inputs supplied at public computer 12 to assure that such inputs have not been altered by malicious software that could be resident on public computer 12. Briefly, any web page 31 receiving user inputs (e.g., sensitive information such as username, password, account number, social security number, etc.) is then synchronized to mobile device 100 where the inputs are presented/highlighted to the user in the form of a confirmation request 32. If the user confirms these inputs at mobile device 100, the web page with the user inputs is transmitted to internet 200 from mobile device 100 as indicated at 33.

Response generation 40 operates to prevent the transmission of certain sensitive information to public computer 12 from mobile device 100 while allowing the insensitive information to be synchronized to public computer 12. For example, it may be desirable to prevent transmission of an internet session ID or HTTP "cookies" to public computer 12 from mobile device 100. Further, since many websites display a "logged in" username, it may be desirable to prevent such information from being transmitted to public computer 12 once that web page has been accessed by mobile device 100. Briefly, any new web page 41 loaded from internet 200 onto mobile device 100 is processed at 42 to secure and/or strip selected information (i.e., sensitive information) therefrom to thereby generate a modified page. It is the modified page 43 that is then transmitted to public computer 12 where page content without sensitive information is displayed.

Figure 3:
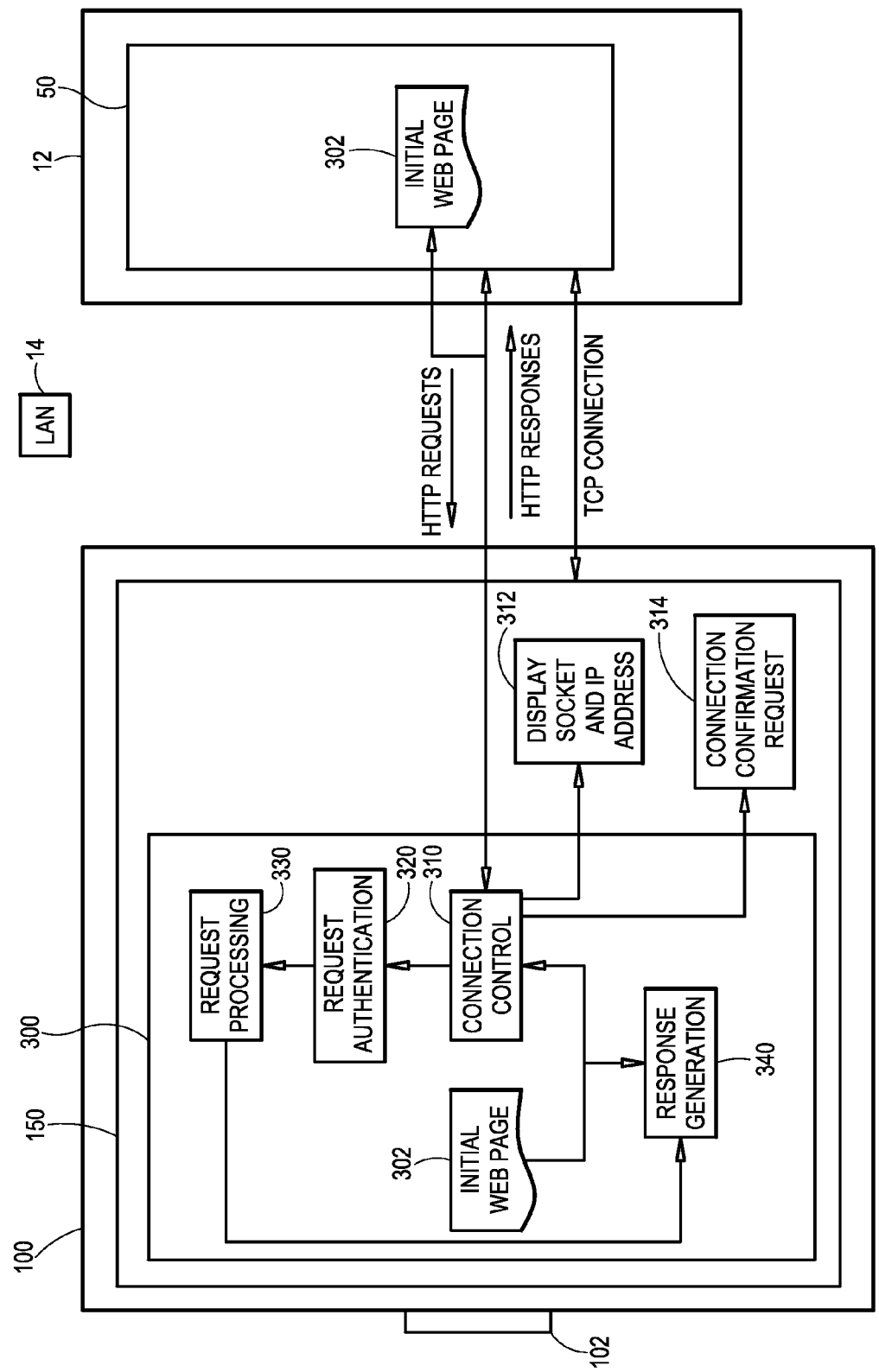
FIG. 3 is a top-level view of a system architecture installed and operating on a mobile device in accordance with an embodiment of the present invention.

An embodiment of a system architecture for carrying out the above-described functions is illustrated in FIG. 3 and is referenced in general by numeral 300. Once again, the processing environments of mobile device 100 and computer 12 are also indicated. As mentioned above, system architecture 300 is installed/resident on mobile device 100. Thus, the present invention does not require any modification to computer 12. At the network level, computer 12 can access mobile device 100 via transmission control protocol (TCP) connections. At the application level, the computer's browser 50 communicates with the mobile device's browser 150 using hypertext transfer protocol (HTTP).

It is assumed that a user has initiated an internet session using mobile device 100 such that browser 150 is opened. It is also assumed that user has activated system architecture 300. For example, activation could be accomplished through an "app" provided on the display of mobile device 100.

The illustrated embodiment of system architecture 300 has four main components or modules: connection control 310, request authentication 320, request processing 330, and response generation 340. Architecture 300 also contains an initial web page 302 that is typically a hypertext mark-up language (HTML) file that will be transferred to the computer's browser 50 as will be explained further below. Each of the four modules will be described in detail below.

Connection control 310 begins when system architecture 300 is invoked by a user. Initially, connection control 310 identifies a server socket 102 of mobile device 100 as well as the Internet Protocol (IP) address of LAN 14 associated with computer 12. Connection control 310 displays the identity 312 of server socket 102 and the IP address of computer 12 as assigned by LAN 14 as a Uniform Resource Locator (URL) address on the mobile device's browser 150. The user then enters this particular URL address in browser 50 of computer 12. As a result, browser 50 sends out an HTTP request (wirelessly or over a hardwired connection) to mobile device 100. Upon receiving this HTTP request, connection control 310 displays a connection confirmation request 314 on browser 150 where request 314 re-displays the URL address entered by the user on computer 12. Once the user confirms/accepts request 314, a communication link between mobile device 100 and computer 12 is established.

Figure 4:
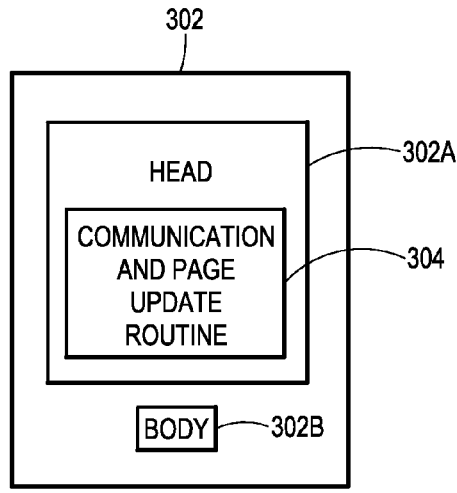
FIG. 4 is a schematic view of an initial page transmitted from the system architecture on the mobile device to the web browser of a public computer in accordance with an embodiment of the present invention.

With the communication link established, connection control 310 transmits initial web page 302 to browser 50 of computer 12. Just like a regular website page, initial web page 302 has a head 302A and a body 302B as illustrated in FIG. 4. Body 302B is essentially a simple form that asks the user to enter a one-time-use password at computer 12, the use of which will be explained further below. Head 302A contains a communication and page update routine 304 that will run in the background of computer 12 once head 302A is loaded on browser 50. In general, routine 304 controls communication between computer 12 and connection control 310, and updates the page content on browser 50. For example, routine 304 can be an "Asynchronous JavaScript and XML" (Ajax) based routine or routine snippet (or Ajax-snippet as it will be referred to hereinafter) that is commercially and/or freely available. Such Ajax-snippet routines are well-known web applications that can retrieve data in the background without interfering with the display and behavior of an existing web page. The Ajax-snippet is a set of XML HTTP Request (XHR) related objects and functions. Once initial web page 302 is loaded on the computer's browser 50, Ajax-snippet 304 will periodically send out "POST" type XHR polling requests to connection control 310 running on mobile device 100. More specifically, Ajax-snippet 304 sends out an XHR polling request from browser 50 and connection control 310 returns a response. In this way, all further communication between browser 50 and browser 150 can be automatically carried out.

If Ajax-snippet 304 running on browser 50 receives a response message from browser 150 that contains a new web page, Ajax-snippet 304 will update browser 50 in synchronization with the page content on browser 150. However, Ajax-snippet 304 always resides in the head of the current web page on browser 50 in order to maintain communication with browser 150. Ajax-snippet 304 uses "POST" type XHR polling requests so that any interaction information such as "clicking on links" or "form filling" on browser 50 can be directly placed on an XHR polling request and sent to browser 150.

Request authentication 320 uses the one-time-use password mentioned above to secure or limit communication to/between mobile device 100 and computer 12. The one-time-use password is stored on browser 150 and is used by Ajax-snippet 304 running on browser 50. For example, the password can be used by Ajax-snippet 304 to compute a "keyed-hash message authentication code" (HMAC) for each XHR polling request. That is, before sending out an XHR polling request, Ajax-snippet 304 computes an HMAC for the header and content of the request and appends the HMAC as an additional parameter of the request.

When connection control 310 receives an XHR polling request, it forwards same to request authentication 320. Next, request authentication 320 computes a new HMAC using the stored password and compares it with the HMAC embedded in the received request. If the two HMACs are identical, the XHR polling request is regarded as valid and is further forwarded to request processing 330. As a result, only communications originating from the particular computer 12 are processed. This is important if/when computer 12 is near one or more public computers.

Request processing 330 is invoked when it receives a valid XHR polling request as just described. In general, request processing 330 performs new page content checking and merging of interaction information. New page content checking involves determining whether a new web page on browser 150 needs to be synchronized to browser 50 on computer 12. Merging of interaction information involves determining whether a user's interaction information supplied to browser 50 needs to be merged to browser 150 on mobile device 100. Exemplary methods for accomplishing these two functions will be described briefly below.

With respect to new page content checking, request processing 330 keeps a timestamp for the latest web page on browser 150. Whenever a new page is synchronized to browser 50 on computer 12, the timestamp is also sent to Ajax-snippet 304. Further, whenever Ajax-snippet 304 sends an XHR polling request to connection control 310, the transmitted XHR polling request carries back the timestamp of the current web page on browser 50. Request processing 330 then compares the two timestamp values to determine if the web page on browser 50 is older than the web page on browser 150. If this is the case, request processing 330 informs response generation 340 that it is time to synchronize the web page on the mobile device's browser 150 to the computer's browser 50. If this is not the case, request processing 330 informs response generation 340 that a non-response should be sent to Ajax-snippet 304.

With respect to merging of interaction information, request processing 330 examines the content of the "POST" type XHR polling requests to see if any interaction information is carried back from browser 50. If new interaction information is carried in the XHR polling request, request processing 330 will further execute the following four steps to merge the interaction information to the mobile device's browser 150. First, it will accurately reflect the interaction information (e.g., form filling information) to the corresponding web page elements on browser 150. Second, it will highlight those web page elements and scroll them into the view window of browser 150. Third, it will display a modal dialog box to ask the user to verify the highlighted web page elements. Finally, if the user confirms that the interaction information reflected on browser 150 is what the user did on browser 50, request processing 330 will actually perform the interaction (e.g., submitting a form) on browser 150. If the user does not confirm the interaction information, request processing 330 will undo the changes made in the first two steps and ignore the interaction information carried in this XHR polling request. By only performing confirmed interaction information on browser 150, request processing 330 assures a user that important interaction information is not tampered with or infected by attackers.

Figure 5:
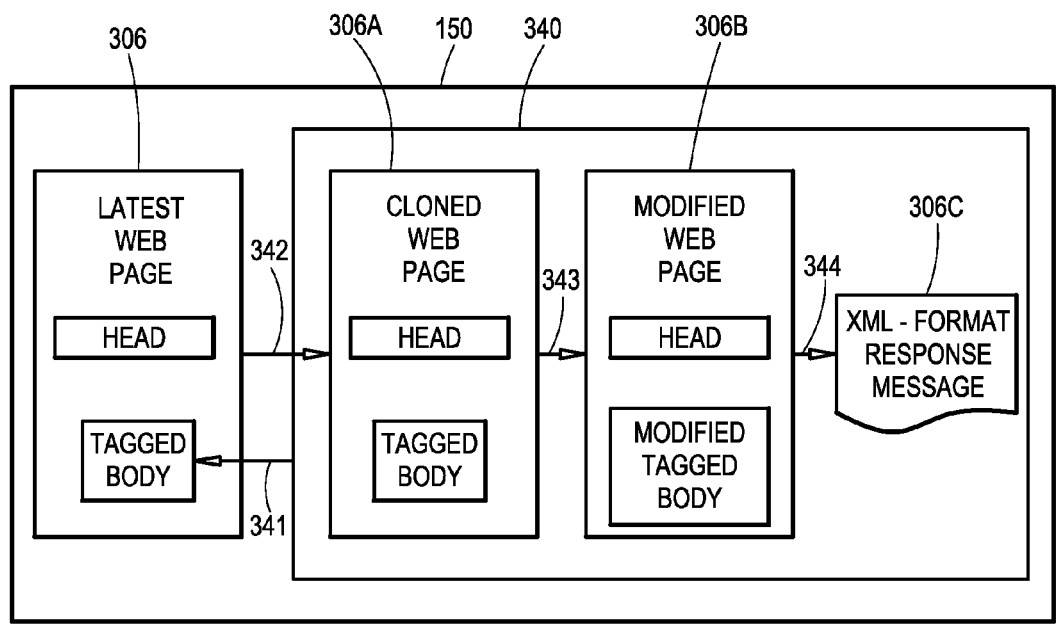
FIG. 5 is a schematic view of the four main steps used to accomplish the response generation function in accordance with an embodiment of the present invention.

Response generation 340 is responsible for generating responses for new web page requests from browser 50. However, response generation 340 must do this without transmitting any sensitive information (e.g., usernames, password, session IDs, etc.) from the mobile device's browser 150 to the computer's browser 50. An exemplary procedure for response generation 340 involves four main steps 341-344 that will be described below with the aid of FIG. 5 where the result of each step is illustrated after the arrowhead associated with the indicated arrow line. In a tagging step 341, response generation 340 adds identification attributes to the interested actionable elements of the latest web page 306 on browser 150. As used herein, the phrase "interested actionable elements" defines the elements (of a web page) on which keyboard or mouse interactions will trigger the loading of a new web page. For example, links, forms and "clickable" elements outside of forms can all be regarded as interested actionable elements. Tagging step 341 allows the present invention to use unique element identifiers to accurately track interested actionable elements on both browsers 50 and 150. By directly tagging web page 306 on browser 150, response generation 340 saves memory space and avoids the complexity of using any additional mapping mechanisms.

In cloning step 342, response generation 340 can use a standard method (e.g., the cloneNode Document Object Model) to clone a complete copy 306A of tagged page 306. Subsequent modification step 343 is performed on cloned copy 306A. More specifically, modification step 343 involves three main modifications of cloned web page 306A in order to generate modified web page 306B. The three main modifications are URL address modification, event handler modification, and sensitive information filtering.

With respect to URL address modification, each HTML web page has a set of associated supplementary objects such as stylesheets, images and scripts. After loading a web page synchronized from browser 150, browser 50 must also download the associated supplementary objects in order to accurately render the web page. To support the downloading of supplementary objects, response generation 340 changes all the relative URL addresses contained in cloned web page 306A to the absolute address of the original web servers.

To track a user's interaction with the same web page on browser 50, response generation 340 must change the event handlers of those interested actionable elements. For form elements, response generation 340 changes their "onsubmit" event handlers by adding a call to a specific JavaScript function residing in Ajax-snippet 304. Therefore, when the user submits a form on browser 50, the identification attribute value and element values of the form will be passed to Ajax-snippet 304 and then sent back to connection control 310 via an XHR polling request. In a similar way, response generation 340 changes "onclick" event handlers of links and other clickable input elements outside of the forms to track click interactions performed on browser 50.

Filtering sensitive information involves synchronizing web page documents to browser 50 without allowing session control information such as HTTP cookies to be leaked to computer 12. Therefore, response generation 340 only needs to filter out sensitive information contained in a web page itself. To achieve this goal, response generation 340 can employ one or both of the following two strategies depending on the nature of the web page.

A first strategy involves removing any possibly sensitive information that is useless to the interaction and display of the web page on browser 50. For example, web pages often contain sensitive information such as session IDs in their URL links and form action attributes. Response generation 340 simply sets all form action attribute values to empty. Note that tracking form submitting and link clicking is enabled by the above event handler modifications. Therefore, the original action and "href" attribute values are useless to the interaction of a web page on browser 50.

The second strategy is to obfuscate personalized sensitive information. The basic idea is to replace user-specified sensitive information with information that is meaningless to attackers. For example, many websites display username information on their web pages for a logged-in user. Preventing the leakage of username information is important for protecting against attacks such as phishing and/or subsequent password guessing. Response generation 340 maintains a rule table in which simple filtering rules are defined by a user to specify which information should be obfuscated for each specific website. These rules could be defined for stable values (e.g., username), and they could also be defined for dynamic values (e.g., online banking balances) if the corresponding HTML elements of those values have stable IDs. Response generation 340 then simply applies the rules to remove sensitive information contained in cloned web page 306A.

The final step in response generation 340 is a generating step 344 that extracts information from modified web page 306B and generates an XML-format response message 306C. The response message is in XML-format so that Ajax-snippet 304 can accurately extract structured response information from the responseXML attribute of an XHR object. The modified web page 306B is an HTML document, but an XHR object expects to receive a valid XML document. Since HTML web pages are often malformed, directly sending modified web page 306B to Ajax-snippet 304 will often result in parsing errors. Therefore, response generation 340 extracts essential head and body information from modified web page 306B, encapsulates the extracted information in an XML-format response message 306C, and finally sends out response message 306C to Ajax-snippet 304.

The advantages of the present invention are numerous. An internet session on a public computer is rendered secure by an architecture that need only be installed on a user's trusted mobile device. Sensitive information is never transmitted to the public computer and all information entered on the public computer is readily confirmed by the user of the mobile device.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

We claim:

1. A web browsing security system architecture configured to operate on a mobile device that has initiated an internet communication session via a local area network (LAN), comprising:

a connection control module for identifying a server socket of the mobile device and an Internet Protocol (IP) address of the LAN, said connection control module initiating a communication link with a computer providing internet communication via the LAN after the computer's internet browser is addressed to the IP address of the LAN and the server socket of the mobile device, said connection control module transmitting an initial page to the computer using said communication link wherein said initial page is loaded on the computer's internet browser, said initial page incorporating a routine for execution in the computer's background, said routine sending and receiving communications to said connection control module over said communication link and updating page content of the computer's internet browser;

a request authentication module coupled to said connection control module and communicating with said routine executing on the computer, said request authentication module limiting said communication link to the mobile device and the computer;

a request processing module coupled to said request authentication module for (i) detecting when the mobile device has loaded a new page received via the server socket, (ii) detecting presence of interaction information input by a user into the computer and transmitted to the mobile device via said communication link, (iii) generating a verification request at the mobile device when said interaction information is detected, and (iv) transmitting said interaction information from the mobile device as an internet communication via the LAN only when said verification request is confirmed by the user at the mobile device; and a response generation module coupled to said request processing module and said connection control module for processing said new page loaded at the mobile device to perform at least one of removal and obfuscation of selected information associated with said new page wherein a modified page is generated, said response generation module providing said modified page to said connection control module wherein said modified page is transmitted to the computer using said communication link, and wherein said page content of the computer's internet browser is updated to said modified page using said routine;

wherein said request authentication module is adapted to receive a user-supplied password, said request authentication module providing said password to said routine executing on the computer, wherein said routine encodes said communications sent to the mobile device with said password and wherein said request authentication module verifies said password in each of said communications sent.

2. A web browsing architecture as in claim 1, wherein said communication link is wireless.

3. A web browsing architecture as in claim 1, wherein said routine comprises an Asynchronous JavaScript and XML (Ajax) based routine.

4. A secure web browsing method, comprising the steps of:

providing a mobile device that has initiated an internet communication session via a local area network (LAN);

identifying, at the mobile device, a server socket of the mobile device and an Internet Protocol (IP) address of the LAN;

initiating, at the mobile device, a communication link with a computer providing internet communication via the LAN after the computer's internet browser is addressed to the IP address of the LAN and the server socket of the mobile device;

transmitting an initial page from the mobile device to the computer using said communication link wherein said initial page is loaded on the computer's internet browser, said initial page incorporating a routine for execution in the computer's background, said routine sending and receiving communications to the mobile device over said communication link and updating page content of the computer's internet browser;

limiting said communication link to the mobile device and the computer;

detecting, at the mobile device, presence of interaction information input by a user into the computer and transmitted to the mobile device via said communication link;

generating a verification request at the mobile device when said interaction information is detected;

transmitting said interaction information from the mobile device as an internet communication via the LAN only when said verification request is confirmed by the user at the mobile device;

detecting, at the mobile device, when the mobile device has loaded a new page received via the server socket;

processing said new page loaded at the mobile device to perform at least one of removal and obfuscation of selected information associated with said new page wherein a modified page is generated;

transmitting said modified page to the computer using said communication link; and updating said page content of the computer's internet browser to said modified page using said routine;

wherein said step of limiting comprises the steps of:

requesting, at the mobile device, a user-supplied password;

transmitting said password to said routine executing on the computer, wherein said routine encodes said communications sent to the mobile device with said password; and verifying, at the mobile device, said password in each of said communications.

5. A method according to claim 4, wherein said communication link is wireless.

6. A method according to claim 4, wherein said routine comprises an Asynchronous JavaScript and XML (Ajax) based routine.

7. A web browsing security system architecture for a mobile device that has initiated an internet communication session via a local area network (LAN), comprising:

a first processing architecture for establishing a communication link with a computer having an internet browser and being providing internet communication via the LAN, and for transmitting a routine to the computer via said communication link, said routine synchronizing page content of the mobile device to the computer's internet browser;

a second processing architecture for (i) detecting user-supplied inputs to said page content on the computer's internet browser, (ii) generating a verification request at the mobile device when at least a portion of said user-supplied inputs are detected, and (iii) transmitting said user-supplied inputs from the mobile device as an internet communication via the LAN only when said verification request is confirmed by the user at the mobile device;

a third processing architecture for processing each new page loaded at the mobile device to perform at least one of removal and obfuscation of selected information associated with said new page wherein a modified page is generated, said third processing architecture transmitting said modified page to the computer using said communication link, and wherein said page content of the computer's internet browser is updated to said modified page using said routine; and a fourth processing architecture adapted to receive a user-supplied password at the mobile device, said third processing architecture providing said password to said routine executing on the computer, wherein said routine encodes said communications sent to the mobile device with said password and wherein said fourth processing architecture verifies said password in each of said communications sent.

8. A web browsing architecture as in claim 7, wherein said communication link is wireless.

9. A web browsing architecture as in claim 7, wherein said routine comprises an Asynchronous JavaScript and XML (Ajax) based routine.

* * * * *